United States Patent
Yates et al.

(10) Patent No.: US 7,234,293 B2
(45) Date of Patent: Jun. 26, 2007

(54) FUEL SUPPLY SYSTEM

(75) Inventors: Martin Kenneth Yates, East Haddon (GB); Philip Laurence Elliott, Birmingham (GB)

(73) Assignee: Goodrich Control Systems Limited (GB)

(*) Notice: Subject to any disclaimer, the term of this patent is extended or adjusted under 35 U.S.C. 154(b) by 362 days.

(21) Appl. No.: 11/039,071

(22) Filed: Jan. 19, 2005

(65) Prior Publication Data
US 2005/0262824 A1  Dec. 1, 2005

(30) Foreign Application Priority Data
Jan. 21, 2004  (GB)  ................. 0401207.6

(51) Int. Cl.
*F02C 7/22*  (2006.01)
*F02C 9/26*  (2006.01)

(52) U.S. Cl. ...................... 60/39.281; 60/734
(58) Field of Classification Search ........... 60/39.27, 60/39.281, 243, 734
See application file for complete search history.

(56) References Cited

U.S. PATENT DOCUMENTS

| 4,245,964 A | 1/1981 | Rannenberg |
| 4,736,582 A | 4/1988 | Smith et al. |
| 5,513,493 A * | 5/1996 | Severn et al. ............ 60/39.281 |
| 5,709,079 A * | 1/1998 | Smith ....................... 60/39.281 |
| 6,176,076 B1 | 1/2001 | Ford |
| 6,813,876 B2 * | 11/2004 | Griffiths et al. .......... 60/39.281 |
| 2003/0192300 A1 * | 10/2003 | Mahoney et al. ......... 60/39.281 |

FOREIGN PATENT DOCUMENTS

EP  1335121  8/2003

* cited by examiner

*Primary Examiner*—L. J. Casaregola
(74) *Attorney, Agent, or Firm*—Andrus, Sceales, Starke & Sawall, LLP

(57) ABSTRACT

A fuel supply system for a gas turbine engine including first and second positive displacement pumps operated simultaneously to supply fuel under pressure from a low pressure source, a combining spill valve controlling the output flows from the first and second pumps to combine the outputs of the first and second pumps for supply to a metering valve of the system, or to spill some or all of the output of one or both pumps back to the low pressure supply, a pressure raising and shut off valve arrangement downstream of the metering valve for isolating the fuel system from an associated engine until the fuel pressure upstream of the pressure raising and shut off valve arrangement exceeds a predetermined pressure, and, a control system dependent upon the position of the combining spill valve for reducing said predetermined pressure at which said pressure raising and shut off valve arrangement opens.

8 Claims, 4 Drawing Sheets

FUEL SUPPLY SYSTEM

TECHNICAL FIELD

This invention relates to a fuel supply system for a gas turbine engine, primarily, but not exclusively, an aircraft gas turbine engine.

BACKGROUND ART

A conventional fuel supply system uses a positive displacement pump, for example a gear pump, driven from the gas turbine engine trough the intermediary of an accessory gearbox, to provide fuel through a fuel metering system to the burners of the gas turbine engine. The positive displacement pump which, in the interests of clarity will be referred to herein as a "gear pump", receives fuel from a fuel supply through a low pressure lift pump or the like, and it will be recognised that the rotational speed of the gear pump, and thus the output of the pump is directly proportional to the shaft speed of the gas turbine engine. Generally the capacity and therefore the size of the pump is calculated on the basis of the maximum fuel flow which will be needed in use, and of course a safety margin is applied on top of that maximum. Thus there will be many operating conditions, notably engine idle conditions where the output of the pump exceeds the demand of the engine.

Excess fuel from the pump output is spilled back to the low pressure side of the fuel system through a spill valve which is arranged to operate to maintain a substantially constant pressure drop across the fuel metering valve of the fuel metering system. A pressure raising and shut-off valve (PRSOV) is interposed between the metering valve and the engine burners, and ensures that the fuel system upstream of the PRSOV is pressurised to a sufficient level that ancillary equipment powered by fuel pressure, for example engine control vanes, can be operated. Additionally the PRSOV provides a means of isolating the gas turbine engine burners from the fuel supply system when the engine is to be shut-off.

A recognised difficulty of the conventional system described briefly above is known as "heat rejection". When the gear pump is pumping fuel against system pressure then the action of spilling fuel in excess of engine demand to the low pressure side of the system results in heating of the fuel. As fuel is used as a cooling medium for other engine system, the greater the level of rejection of heat into the fuel by the fuel pumps the lower is the capacity of the feel to cool other components. In addition, energy from the engine is wasted in heating the fuel through heat rejection at the fuel pumps thus resulting in an overall increase in engine fuel consumption.

It has been proposed to minimise heat rejection problems by utilising two gear pumps to supply fuel through the metering system to the engine, both pumps being driven simultaneously and continuously from the engine shaft, but at least one of the pumps being arranged to spill its output back to the low pressure side of the fuel system when its output is not needed the output being spilled directly back to the low pressure side of the system so that the pressure increase across the pump is minimal, and thus the heating of the fuel displaced by the pump is minimal. U.S. Pat. No. 4,245,964 discloses such a fuel supply system.

It will be recalled from the description of the conventional system above hat a PRSOV maintains system pressure upstream of the PRSOV at a predetermined minimum level consistent with safe operation of ancillary equipment of the engine. If the pressure in the system upstream of the PRSOV drops below the predetermined level then the engine is isolated by the PRSOV from the fuel supply system. During normal operation of a gas turbine engine the pressure upstream the PRSOV will be more than adequate, and the PRSOV will not isolate the engine from the fuel supply system unless specifically commanded to do so in an engine shut-down sequence.

In the event of combustion failure within an engine during flight (a, so called, "flame-out" condition) it is desirable to be able to relight the engine during flight by utilising the rotation of the engine shaft caused by the passage of air through the engine in flight ("windmilling"). Modern turbofan engines have a "windmill relight speed" which is very low compared with the normal shaft speed of the engine when operating in flight or when being started on the ground using either ground power or an air starter motor. The "windmill relight speed" is the engine shaft speed at which relight of a failed engine can be initiated when the engine shaft is being rotated by the passage of air through the failed engine in flight.

Operation of the PRSOV to maintain pressure upstream of the PRSOV can cause difficulties during windmill relight in that the rotational speed of the engine shaft, and thus the rotational speed and output of the gear pump is insufficient to provide the pressure rise in the fuel metering system necessary to open the PRSOV for fuel to be supplied to the engine to allow the engine to start (relight). Internal leakage within the pump, and parasitic flows in the fuel system can exacerbate the problem, but even when such internal leakage and parasitic flows are minimised the pump still may not be capable of delivering sufficient pressure rise into the system to open the PRSOV at windmill relight speeds. Our U.S. Pat. No. 6,176,076 discloses ways of minimising the pressure rise which is needed in the system in order for the PRSOV to be opened so that the engine can be started.

The solution proposed in our U.S. Pat. No. 6,176,076 is to provide a passive restrictor in the spill line from the gear pump, and to use the pressure increase in the spill-line provided by the passive restrictor to influence the pressure at which the PRSOV opens In such a system the pressure required to open the PRSOV varies in response to the amount of fuel spilled by the spill valve associated with the gear pump Thus in normal flight conditions, where a significant volume of fuel is being spilled from the gear pump output, the pressure developed across the passive restrictor will be relatively high resulting in a high pressure in the spill line which will cause the PRSOV to maintain a relatively high pressure upstream thereof in the metering system, whereas in engine start situations particularly windmill relight situations where very little, if any, fuel is spilled from the pump output due to the low pump speed the PRSOV is influenced by a much lower pressure developed across the passive restrictor in the spill line to maintain the pressure upstream of the PRSOV at a minimum value consistent with engine starting and allow the PRSOV to open at such lower pressure. Once the engine is started the pump speed and output volume will rise rapidly and the system pressure will increase as a greater volume of feel is spilled back to low pressure through the passive restrictor.

The use of such a passive restrictor in the spill line as disclosed in our U.S. Pat. No. 6,176,076 is a solution to the windmill relight difficulties of an engine supplied from a traditional, single, gear pump fuel supply system. However, use of such a passive restrictor would negate the heat rejection advantages of using twin gear pumps rather than a single gear pump as the gear pump whose output is not needed and which is being spilled back to the low pressure side, would then be pumping fuel against a pressure rise caused by the passive restrictor, and heating of the spilled fuel would result.

It is an object of the present invention to provide fuel supply systems utilising twin gear pumps in which the windmill relight problems can be minimised or obviated, without negating the heat rejection advantages of using twin gear pumps.

DISCLOSURE OF INVENTION

In accordance with the present invention there is provided a fuel supply system for a gas turbine engine including first and second positive displacement pumps operated simultaneously to supply fuel under pressure from a low pressure source, a combining spill valve controlling the output flows from the first and second pumps to combine the outputs of the first and second pumps for supply to a metering valve of the system, or to spill some or all of the output of one or both pumps back to the low pressure supply, pressure raising and shut off valve means downstream of the metering valve for isolating the fuel system from an associated engine until the fuel pressure upstream of the pressure raising and shut off valve means exceeds a predetermined pressure, and, means dependent upon the position of the combining spill valve for reducing said predetermined pressure at which said pressure raising and shut off valve means opens.

Preferably said pressure raising and shut off valve means includes a closure member normally biased towards a position in which the pressure raising and shut off valve means is closed, and so establishing a normal minimum operating pressure upstream of the pressure raising and shut off valve means at which the pressure raising and shut off valve means opens, and pressure means for opposing closure movement of said closure member reducing said predetermined pressure at which the pressure raising and shut off valve means opens, said pressure means being supplied from the output of said second pump when said combining spill valve is in a position such that none, or no more than a small proportion, of the output of said second pump is spilled to low pressure.

Desirably said pressure means is a push-piston which can push the closure member of the pressure raising and shut off valve means in an opening direction depending upon the pressure applied to the push-piston.

Alternatively said pressure raising and shut off valve means includes a closure member normally biased by means including fluid pressure towards a position in which the pressure raising and shut off valve means is closed, and so establishing a normal minimum operating pressure upstream of the pressure raising and shut off valve means at which the pressure raising and shut off valve means opens, said combining spill valve providing a connection to the pressure raising and shut off valve means which is opened to low pressure to reduce the closing pressure acting on the closure member of the pressure raising and shut off valve means, when the combining spill valve is in a position such that the outputs of the first and second pumps are combined and none, or no more a small proportion, of the output of the second pump is spilled to low pressure.

Desirably said second positive displacement pump is of larger capacity than said first positive displacement pump.

PREFERRED MODE OF CARRYING OUT THE INVENTION

Figure 1:
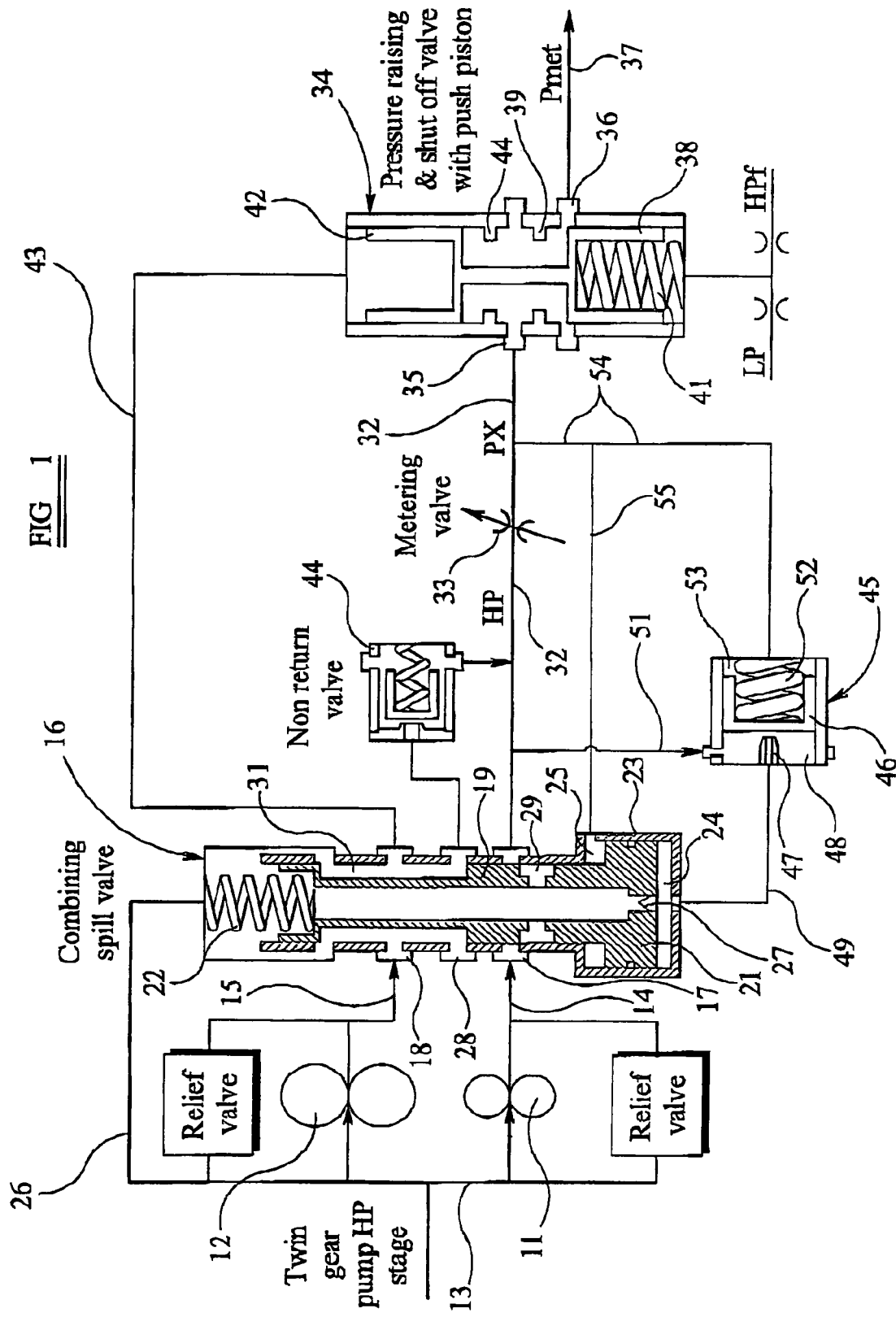
FIG. 1 is a diagrammatic representation of a fuel supply system for a gas turbine engine in accordance with a first example of the present invention.

Referring first to FIG. 1 of the drawings the fuel supply system includes first and second gear pumps 11, 12 both of which are driven simultaneously from the gas turbine engine through a conventional accessory gearbox. The inlet ports of the pumps 11, 12 are connected to a low pressure line 13 of the fuel supply system, the line 13 being supplied with fuel at low pressure few a reservoir by a low pressure pump. The output ports of the pumps 11, 12 are connected through respective output lines 14, 15 to respective inlet galleries 17, 18 in the housing of a Combining Spill Valve (CSV) 16. Conventional pressure relief valves are connected across the pumps 11, 12 between their output lines and the low pressure line 13 to provide a discharge route for fuel back to the line 13 in the event of a blockage or an excessive build-up of fuel pressure downstream of the pumps. Normally however the relief valves do not open.

Movable axially within the housing of the CSV 16 is a spool 19 having an integral piston 21 at one axial end thereof. For convenience it will be assumed throughout the remainder of this description that the CSV 16 is mounted vertically with the piston 21 at the lower end of the spool 19.

A helically coiled compression spring 22 acts against the upper end of the spool 19 to urge the spool downwardly, and the piston 21 slides within a cylinder region 23 of the housing of the CSV, pressure chambers 24 and 25 being defined within the cylinder 23 at the lower and upper ends respectively of the piston 21. The spool 19 is hollow, and opens at its upper end into a chamber of the housing of the valve containing the spring 22 and connected through a line 26 to the low pressure line 13. A restricted, bleed orifice 27 at the lower end of the spool 19 places the interior of the spool 19 and thus the line 26 in communication with the chamber 24 beneath the piston 21.

The galleries 17, 18 of the CSV housing are annular, encircling the housing, and a third, similar annular gallery 28 is provided in the CSV housing axially spaced approximately mid-way between the galleries 17 and 18. The exterior of the spool 19 is formed with first and second circumferential grooves 29, 31 the groove 29 being associated in use with the gallery 17 and being connected, by means of radial drillings, to the hollow interior of the spool 19 and thus to the low pressure line 13 through the line 26. The groove 31 is wide, and thus has a considerable extension in the axial direction of the spool and coacts with the gallery 28, the gallery 18, and an internal gallery connected to the low pressure chamber of the CSV housing containing the spring 22 (hereinafter referred to as the low pressure chamber of the CSV). The operation of the CSV 16 will become apparent from the following description.

The gallery 17 of the CSV housing interconnects the output line 14 of the pump 11 and a main fuel supply line 32 containing the metering valve 33 of the fuel supply system. Downstream of the metering valve 33 the line 32 is connected to an inlet gallery 35 of a pressure raising and shut-off valve (PRSOV) 34. An outlet gallery 36 of the PRSOV 34 is connected through a line 37 to the burners of the gas turbine engine associated with the fuel supply system.

The housing of the PRSOV 34 slidably receives a piston 38 movable within the housing between a position in which the gallery 36 is connected to the gallery 35 through the interior of the PRSOV and a position in which the piston 38 closes the gallery 36 disconnecting the line 37 from the line 32 of the supply system The piston 38 is urged by a spring 41 towards an internal stop 39, the piston 38 engaging the stop 39 to define a closed position of the PRSOV. The face of the piston 38 remote from the spring 41 is exposed to the gallery 35, and thus is exposed to the pressure conditions in the line 32 downstream of the metering valve 33. A push piston 42 is housed within the PRSOV 34 opposite the piston 38 and includes a push rod contactable with the face of the piston 38 which is exposed to the pressure in the gallery 35. The face of the push piston 42 presented to the piston 38 is also exposed to the pressure at the gallery 35, and the opposite face of the push piston 42 is exposed to the pressure at the gallery 18 of the CSV 16 trough a line 43 An internal stop 44 within the housing of the PRSOV 34 limits movement of the push piston 42 in a direction towards the piston 38.

The gallery 28 of the CSV 16 is connected through a non-return valve 44 to the line 32 intermediate the gallery 17 and the metering valve 33. The non-return valve 44 is arranged to allow flow from the gallery 28 to the line 32, but not from the line 32 to the gallery 28.

A servo valve 45 controls the supply of pressurised fuel from the line 32 to the pressure chamber 24 beneath the piston 21 of the CSV 16. The servo valve 45 includes a piston 46 which cooperates with a metering orifice 47 to meter a flow of pressurised fuel from a pressure chamber 48 of the valve 45 through a line 49 to the chamber 24, the chamber 48 being coupled to the line 32 intermediate to the gallery 17 and the metering valve 37 through a line 51. A spring 52 within the housing of the valve 48 urges the piston 46 in a direction to close the metering orifice 47, and the action of the spring 52 is assisted by fuel pressure in a chamber 53 at the opposite side of tie piston 46 from the chamber 48, the chamber 53 being connected through a line 54 to the line 32 downstream of the metering valve 33. A line 55 interconnects the line 54 and the chamber 25 above the piston 21. The servo valve 45 responds to changes in the pressure drop across the metering valve 33, sensed ugh lines 51 and 54 to open or close the valve 48 as the pressure drop across the metering valve increases or decreases respectively.

In operation, when it is required to start the engine supplied by the fuel system the engine will be stationary, and thus there will be no output from either of the pumps 11, 12. The PRSOV will have only low pressure applied to the chamber beneath the piston 38 and the chamber above the piston 42 and so the piston 38 will be in its closed position engaging the stop 39 so isolating the engine from the fuel system. During the normal start sequence the engine will be rotated by a starer motor and so the pumps 11, 12 will start to produce an output. At this stage the pressure in the system will be increasing, and the metering valve will be partially open. However, the pressure drop across the metering valve will be very low such that the servo valve 45 is closed and the chamber 24 of the CSV 16 will be at low pressure by virtue of bleed through the orifice 27 to the line 26. Any pressure increase in the line 32 will be applied to the chamber 25, and thus the chamber 25 will assist the spring 26 in moving the spool 19 to the lower most position in which the groove 29 is below the level of the gallery 17 and so none of the output of the pump 11 is spilled to the low pressure line 13 through the interior of the valve 16 and the line 26. The whole output of the pump 11 passes into the line 32, and through the metering valve 33 to the gallery 35 of the PRSOV 34.

Simultaneously, the position of the groove 31 of the CSV 16 is such that it is disconnected from the internal gallery of the low pressure chamber of the CSV 16 and so none of the output of the pump 12 is spilled to low pressure. In this position, the groove 31 connects the gallery 18 to the gallery 28 and the fuel output of the pump 12 is delivered into the line 32 through the non-return valve 44. Thus the CSV combines the outputs of the pumps 11, 12 so that the output of the pump 12 supplements the output of the pump 11 in supplying fuel through the line 32 and the metering valve 33. Simultaneously the increasing pressure delivered by the pump 12 is applied through the line 43 to the upper face of the push piston 42 of the PRSOV 34 so that the push piston 42 supplements the action of the increasing pressure supplied from the metering valve 33 to the gallery 35, in depressing the piston 38 against the action of the spring 41 and thus opening the gallery 36 so that the engine is supplied with fuel from the mattering valve 33. It will be recognised that by virtue of the push piston 42 and its connection, at his point in the operation, through the line 43 to the output of the pump 12, the pressure rise which is necessary in the system to open the PRSOV 34 is significantly less than would be the case in the absence of the push piston 42. In a conventional engine start sequence where the engine is being run by a starter motor then the presence of the push piston 42 may not be of overriding significance since the starter motor should be capable of rotating the engine, and thus driving the pumps 11, 12 at a sufficient speed to overcome the parasitic losses in the metering system, and permit the generation of sufficient pressure to open the PRSOV 34. However, the same is not true in a windmill relight situation where the speed of the engine shaft may be significantly lower.

During normal operation of the engine, once the start sequence has been completed and the engine speed and consequent speed and volume output from the pumps 11, 12 increases, the pressure drop across the metering valve will increase to a level above the predetermined metering valve pressure drop value such that the servo valve 45 is opened to increase the pressure in the chamber 24 of the CSV 16. Increasing pressure in the chamber 24 will lift the spool 19 of the CSV against the lower pressure in the chamber 25 and the force of the spring 22 so that the flow from the gallery 18 to the gallery 28 by way of the groove 31 and therefore the amount of output of the pump 12 supplied to the line 32 is reduced. At this point in the movement of the spool 19 the groove 31 has already begun to communicate with the internal gallery of the low pressure chamber of die CSV 16 thus providing a spill path for some of the output of the pump 12 to be returned to the low pressure line 13.

Further increase in the pressure drop across the metering valve 33 results in further movement of the spool 19 of the CSV against the action of the spring 22 to produce a situation in which the gallery 28 is closed so that none of the output of the pump 12 is supplied to the line 32 and the whole of the output of the pump 12 is discharged through the low pressure chamber of the valve 16 back to the low pressure line 13. Thus in this situation there is minimal pressure rise across the pump 12, and thus minimal heating of the fuel spilled from the output line 15 back to the low pressure line 13.

If the movement of the spool 19 described above does not reduce the fuel volume supplied to the line 32 sufficiently to reduce the pressure drop across the metering valve 33 to the predetermined pressure drop value ten the piston 21 can drive the spool 19 to a position in which the groove 29 starts to communicate with the gallery 17 and some of the output volume of the pump 11 is also spilled back to the line 13 through the interior of the spool 19 and the line 26.

It will be recognised therefore that after the start condition, if the demand for fuel is relatively low then the output pressure of the pump 12 will be low also since the output of the pump 12 will be connected directly to low pressure through the CSV 16 line 26 and the line 13. Thus the pressure in the line 43 will be low, and the effect of the push piston 42 on the position of the piston 38 will be insignificant. It follows therefore that the pressure of the fuel in the line 32 upstream of the PRSOV 34 will be maintained at a value determined by the position of the piston 38 irrespective of the push piston 42, and thus the PRSOV will be maintaining a system pressure significantly higher than that which it maintains during the start operation. However, in high engine power settings, during, for example, take-off and/or climb of the aircraft, the fuel demand of the engine will initiate opening of the metering valve and tend to reduce the pressure drop across the metering valve 33. The servo valve 45 will thus tend to close reducing the pressure in the chamber 24 of the CSV 16 and reducing, or even terminating, the spilling of the output of the pump 12 to low pressure. In addition to the output pressure of the pump 12 rising, the output will be supplied to the line 32 to augment the supply from the pump 11, and the pressure in the line 43 applied to the push piston 42 will rise accordingly. However, the pressure conditions in the line 32 and thus in the interior of the PRSOV 34 will be such that the piston 38 is close to its fully open position, and although the push piston 42 will be driven towards the piston 38 under the action of the increased output pressure of the pump 12, the push piston 42 will not contact the piston 38, and its movement will be arrested by engagement with its internal stop 44 before it can have any effect on the piston 38.

During normal operation of the PRSOV 34 the lower face of the piston 38 is exposed to pressure and the effect of the sprig 41. However, a valve (not shown) is operable under the command of the electronic engine control system, to connect the pressure chamber beneath the piston 38 of the PRSOV 34 to high fuel pressure to rapidly move the piston 38 to its closed position isolating the engine from the fuel supply system.

Figure 2:
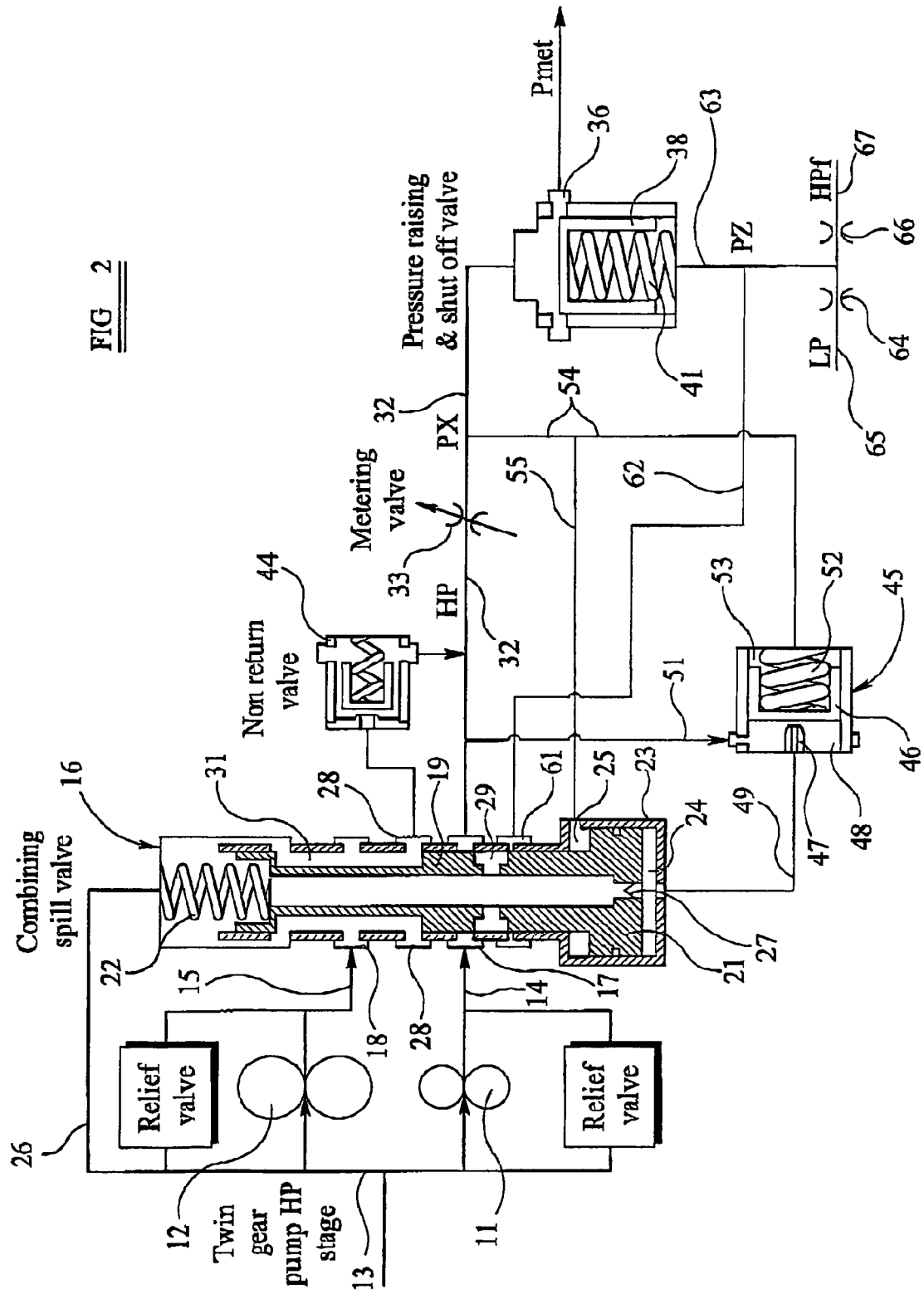
FIG. 2 is a diagrammatic representation of a fuel supply system for a gas turbine engine in accordance with a second example of the present invention.

FIG. 2 illustrates an alternative embodiment of the invention, and components and connections common to FIG. 1 carry the reference numerals which hey carry in FIG. 1. It can be seen that by comparison with FIG. 1 the push piston 42 of the PRSOV 34 is omitted, and a chamber of the PRSOV 34 above the piston 38 is connected to the line 32 downstream of the metering valve 33. Thus one face of the piston 38 is exposed to the pressure downstream of the metering valve 33 while the opposite face of the piston 38 is normally exposed via pressure connection 63 to a pressure, set by the fluid potential divider formed by restrictions 66 and 64, intermediate low pressure and the high pressure in the line 32 and the effect of the return spring 41. As mentioned above in relation to FIG. 1 a valve (not shown) can connect the lower face of the piston to high pressure in the line 32 when it is required that the valve 38 closes quickly.

As there is no push piston in the FIG. 2 embodiment there is no connection equivalent to the line 43 receiving the pressure at the output of the pump 12. Instead, the housing of the CSV 16 is provided with a further gallery 61 positioned axially intermediate to the gallery 17 and the cylinder 23 of the housing of the CSV 16. The gallery 61 is connected through a line 62 to the pressure connection 63 of the pressure chamber beneath the piston 38 of the PRSOV 34.

When the output volume from the fuel pumps is low (due to low engine shaft speed and consequent low gear pump speed) and is not significantly greater than the volume demanded by the engine the pressure drop across the metering valve 33 will be very low, the CSV 16 will be in a position such that little or none of the output of the pump 12 is spilled to low pressure, the spool 19 of the CSV 16 being in a lowermost position under the action of the spring 22 and the pressure in chamber 25 so that the groove 29 is displaced below the gallery 17, and communicates with the gallery 61 so that the lines 63 and 62 and thus the pressure chamber of the PRSOV 34 beneath the piston 38, are connected directly to low pressure through the CSV 16.

It will be noted that the line 63 is connected through a restrictor 64 to a low pressure line 65 ultimately connected to the line 13. Additionally the line 63 is connected though a restrictor 66 to a high pressure line 67 which, in practice, is connected at the outlet of a filter filtering the high pressure flow in the line 32. Thus the lines 65 and 67 with their restrictors 64 and 66 constitute a "pressure potentiometer" which determines the pressure in the line 63 applied to the chamber below the piston 39 in the absence of a connection to the line 62. Normally therefore the pressure in the chamber below the piston 38 of the PRSOV 34 is maintained significantly above the pressure in the line 13 assisting the spring 41 in controlling the PRSOV 34 to maintain the pressure upstream of the PRSOV 34 at or above a predetermined minimum threshold pressure for operation of ancillary equipment of the engine. Similar comments apply to the arrangement described above with reference to FIG. 1, but these are not of particular significance in relation to the operation of FIG. 1, since the operation of the push piston 42 of the system of FIG. 1 overrides the pressure in the chamber below the piston 38 unless the aforementioned shut-off valve is operated to apply only high pressure to the piston 38 to close the PRSOV in a shut-off situation.

However, in the FIG. 2 embodiment it will be recogised that when the spool 19 of the CSV 16 is in a position connecting the line 62 to the line 13 through the CSV then the pressure in the chamber below the piston 38 of the PRSOV 38 is reduced significantly by comparison with its normal operating pressure and thus the PRSOV 34 can be opened by the pressure in the line 32 achieving a significantly lower value than would normally be the case.

Thus in a windmill relight situation the metering valve 33 will be opened, and the output pressure of the pumps 11, 12 will be relatively low due to the low engine speed. The CSV 16 will be in a position connecting the line 62 to the low pressure line 13 so that the PRSOV 34 sets a lower than normal operating system pressure to allow the output of the pumps 11, 12 to be supplied to the engine for windmill relight.

During normal operating conditions there will be a significantly greater volume of fuel pumped by the gear pumps 11, 12 and in order to maintain tho predetermined constant pressure drop across the metering valve 33 a larger volume of fuel will be spilled from one or both of the pump outputs back to Me low pressure side of the pumps and so the spool 19 will be moved to a position in which the line 62 is disconnected from the line 13 so that the PRSOV opening pressure will be determined by the combined effects of the spring 41 and the pressure intermediate low pressure and high pressure set by the restrictions 64, 66. In such situations therefore the system pressure maintained by the PRSOV 34 is very much higher than that in a windmill relight situation.

It will be recognised that in very high engine fuel demand operating conditions (take-off and/or climb)then the mewing valve will be close to fully open and the fuel demand will be close to the maximum output volume of the combined pumps thus the CSV 16 may be returned to a position in which there is little or no fuel spillage to low pressure and the line 62 is connected through the CSV to low pressure. However, in these conditions the PRSOV will be substantially fully open by virtue of the high pressure in the line 32 (the pumps 11, 12 operating at speed) and so the reduction of pressure in the chamber beneath the piston 38 of the PRSOV will have no significance on the operation of the PRSOV.

Figure 3:
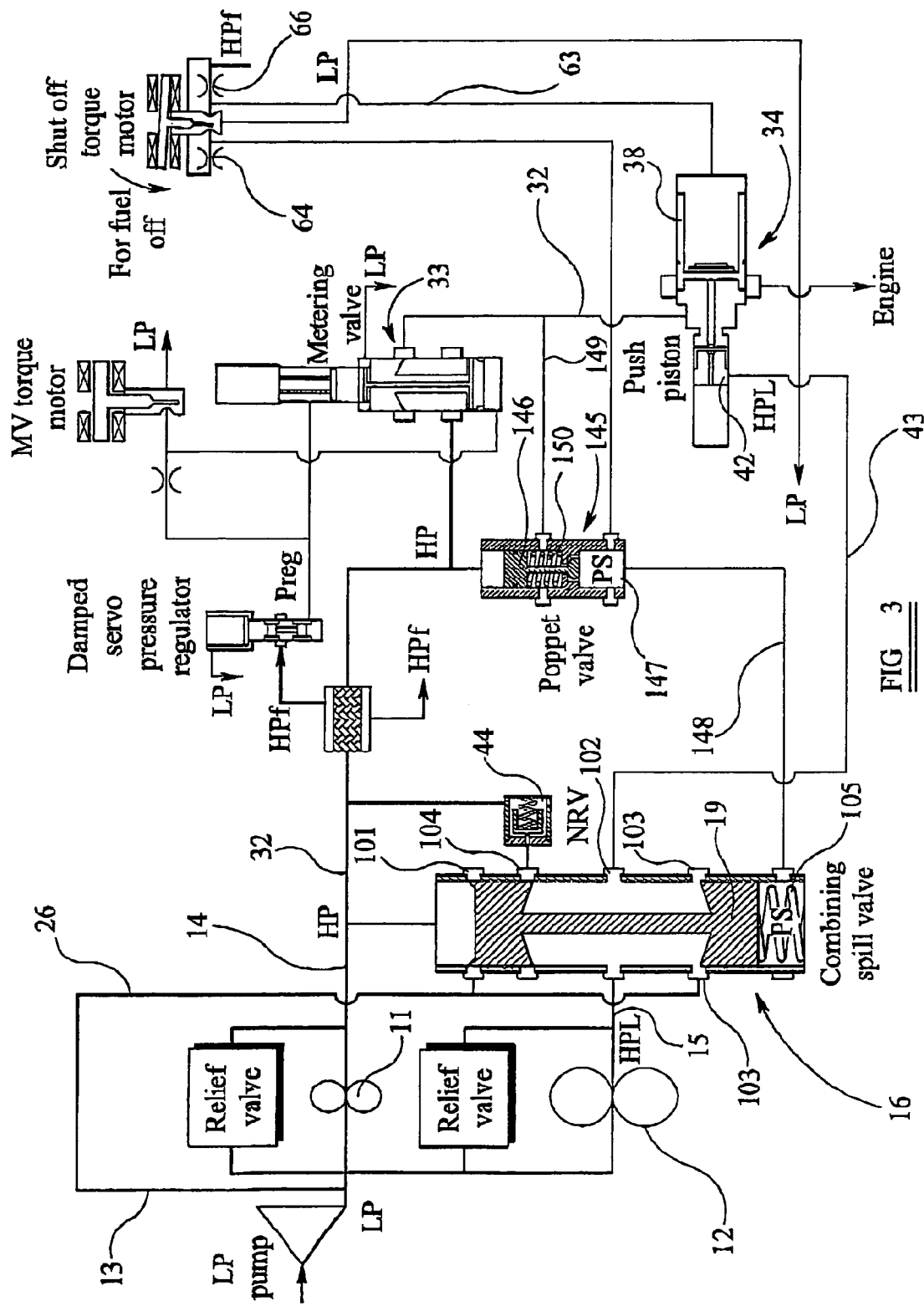
FIG. 3 is a view similar to FIG. 1 of a modification thereof.

FIG. 3 illustrates a modification of FIG. 1, and although FIG. 3 illustrates more control equipment of the fuel metering system, the additional control equipment illustrated in FIG. 3 will be well understood by the skilled man in the art, and a description thereof is not necessary for the skilled man's understanding of the invention.

FIG. 3 carries reference numerals common to FIG. 1 where appropriate. It can be seen in FIG. 3 that the CSV 16 differs in its construction from the CSV 16 of FIGS. 1 and 2. However, the operation of the CSV 16 of FIG. 3 is substantially identical to that described above. Thus the CSV has an axially movable spool 19 which can control the spillage of fuel from a high pressure output line 14 of the pump 11 through a gallery 101 to a line 26 connected to the low pressure line 13. Similarly the spool 19 can control the spillage of fuel from the high pressure output line 15 of the pump 12 through a gallery 102 of the CSV 16 to a gallery 103 connected to the line 26. Additionally the CSV spool 19 controls the flow of high pressure fuel from the output line 15 of the pump 12 through the gallery 102 the valve 16 and a gallery 104 of the valve and thence through a non-return valve 44 to the line 32. Thus, dependent upon the position of the spool 19 the spool can combine the outputs of both pumps 11, 12, into the line 32, or can spill some or all output from the pump 12, and then the pump 11 to the low pressure line 13.

It can be seen that the gallery 102 is connected permanently to the output line 15 of the pump 12 and is connected through a line 43 to the push piston 42 of the PRSOV 34. The spring 41 of the PRSOV 34 is not shown, but it can be seen that the pressure chamber of the piston 38 of the PRSOV is connected to a pressure potentiometer 64, 66 as described above with reference to FIG. 2, through a line 63.

The servo valve 45 is replaced by a poppet valve 145 the movable element 146 of which is exposed on one face to the pressure in the line 32 upstream of the metering valve 33 and is exposed on its opposite face to the pressure in the line 32 downstream of the metering valve 33.

The spool 19 of the CSV 16 is exposed at one end to the pressure in the interconnected lines 14 and 32, and is exposed at its other end to the pressure in a spring chamber 105 connected to a control chamber 147 of the poppet valve 146 through a line 148. The chamber 147 is also supplied with high pressure fuel from a high pressure supply, conveniently the high pressure side of the pressure potentiometer 64, 66. The poppet of the poppet valve 145 can control communication between the chamber 147 and the pressure chamber 150 beneath the element 146, the chamber 150 being connected through a line 149 to the line 32 downstream of the metering valve 33.

The operation of the system shown in FIG. 3 is very similar to the operation of the system shown in FIG. 1. A reduction in the fuel demand of the engine causes a consequential closure in the setting of the metering valve, and thus there is a tendency for the pressure drop across the metering valve to increase resulting in an increased pressure differential across the element 146 of the poppet valve 145. An increase in the pressure differential across the element 146 opens the poppet valve in turn permitting a greater flow from the chamber 147 of the poppet valve to the lower pressure environment in the line 32 downstream of the metering valve 33. The consequentially increased flow out of the chamber 147 results in a reduction in the pressure in the chamber 147 and, by virtue of the line 148 a consequential reduction in the pressure in the chamber 105 of the CSV 16 Reducing the pressure in the chamber 105 causes the spool 19 of the CSV to move initially to open the gallery 103 thus spilling an increasing proportion of the output of the pump 12 back to low pressure. A further reduction in the pressure in chamber 105 permits the spool 19 to move sufficiently far to close the gallery 104 so that thereafter the whole of the output of the pump 12 is spilled through the gallery 103 into the line 26 and from there to low pressure. A fiber reduction in the pressure in chamber 105 opens the gallery 101 to start spilling output of the pump 11 to low pressure. The system will reach a stable condition when the volume of fuel supplied to the metering valve is reduced to the level where the predetermined pressure drop across the metering valve is reestablished.

Conversely, if the metering valve 33 is opened to satisfy an increased demand of the engine then the pressure drop across the metering valve 33 tends to reduce and the pressure difference between the opposite sides of the element 146 of the poppet valve also reduces closing the poppet valve and increasing the pressure in the chamber 147 of the poppet valve. The increased pressure in chamber 147 is reflected in chamber 105 firstly to move the spool 19 to cut off the spill flow trough the gallery 101 so that none of the output of the pump 11 is spilled, and then subsequently to open gallery 104 and close gallery 103 so that the output of the pump 12 is combined with the output of the pump 11 in the line 32. Again, the system will reach a stable condition when the volume of fuel supplied to the metering valve is increased to the level where the predetermined pressure drop across the metering valve is re-established.

As with the arrangement described in FIG. 1 the output line of the pump 12 is permanently connected by way of the gallery 102 and the line 43 to the push piston 42 of the PRSOV 34. Thus when the pressure in the line 32 is relatively low, at very low engine speeds (for example windmill relight conditions) the pressure supplied by the pump 12 is applied to the push piston to partially negate the effect of the spring and pressure acting on the piston 38 of the PRSOV so that the PRSOV opens to connect the line 32 to the engine at a significantly lower operating pressure than would be the case in normal operating conditions. As described above, when the CSV 16 operates to spill output from the pump 12 to low pressure then the pressure in the line 43 is virtually the low pressure existing in the line 13 and the push piston 42 has no effect on the operation of the PRSOV thus restoring the system pressure set by the PRSOV to a higher, normal operating level. Furthermore, as described above when, during very high engine fuel demands, in, for example, take-off and/or climb conditions the metering valve 33 is opened to such an extent that little or no fuel is spilled from either pump by the CSV 16 then although high pressure from the pump 12 will be supplied to the push piston 42 this will have no effect since the piston 38 of the PRSOV 34 will be fully opened and the push piston 42 will engage the internal stop of the PRSOV housing.

Figure 4:
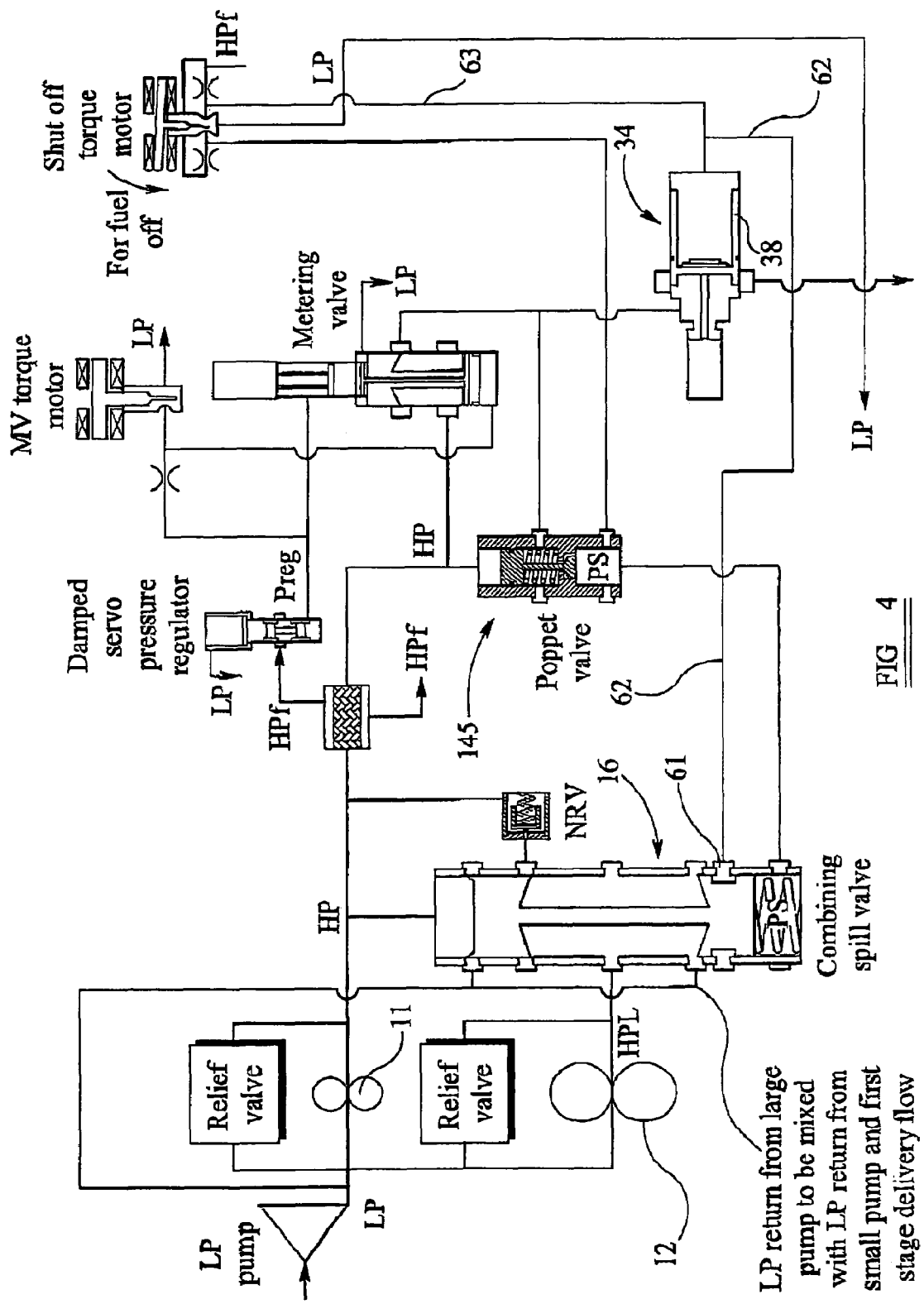
FIG. 4 is a view similar to FIG. 2 of a modification thereof.

FIG. 4 is similar to FIG. 3, but shows a corresponding modification of the FIG. 2 system It can be seen in FIG. 4 that the push piston of the PRSOV 34 is omitted, and the line 63 of the pressure chamber of the piston 38 of the PRSOV is connected through a line 62 to a gallery 61 of the CSV 16. The operation of the system illustrated in FIG. 4 is similar to the operation of the system described above with reference to FIG. 3 with the exception that the gallery 61 of the CSV 16 controls pressure conditions in the pressure chamber of the piston 39 of the PRSOV 34 exactly as described above with reference to FIG. 2.

It will be recognised that in both FIG. 3 and FIG. 4, the steady state condition of the system is such that the volume of fuel allowed to flow through the poppet valve 145 to the point downstream of the metering valve 33 will be exactly that needed to maintain the CSV 16 in the appropriate position to supply sufficient fuel at pressure to maintain the correct differential pressure across tee metering valve. Any movement of the metering valve due to commanded changes of the engine fuel requirement will disturb this steady state condition and the CSV 16 will be adjusted automatically to establish a new relationship between combining the outputs of the pumps 11, 12 and spilling the outputs of the pumps to re-establish steady state conditions but at different metering valve 33 and CSV 16 settings.

The invention claimed is:

1. A fuel supply system for a gas turbine engine including first and second positive displacement pumps operated simultaneously to supply fuel under pressure from a low pressure source, a combining spill valve controlling the output flows from the first and second pumps to combine the outputs of the first and second pumps for supply to a metering valve of the system, or to spill some or all of the output of one or both pumps back to the low pressure supply, a pressure raising and shut off valve arrangement downstream of the metering valve for isolating the fuel system from an associated engine until the fuel pressure upstream of the pressure raising and shut off valve arrangement exceeds a predetermined pressure, and, a control system dependent upon the position of the combining spill valve for reducing said predetermined pressure at which said pressure raising and shut off valve arrangement opens.

2. A fuel system as claimed in claim 1 wherein said pressure raising and shut off valve arrangement includes a closure member, means generating a force whereby said closure member is normally biased towards a position in which the pressure raising and shut off valve arrangement is closed, and so establishing a normal minimum operating pressure upstream of the pressure raising and shut off valve arrangement at which the pressure raising and shut off valve arrangement opens, and pressure means for opposing closure movement of said closure member reducing said predetermined pressure at which the pressure raising and shut off valve arrangement opens, said pressure means being supplied from the output of said second pump, when said combining spill valve is in a position such that none of the output of said second pump is spilled to low pressure.

3. A fuel system as claimed in claim 1 wherein said pressure raising and shut off valve arrangement includes a closure member, means generating a force whereby said closure member is normally biased towards a position in which the pressure raising and shut off valve arrangement is closed, and so establishing a normal minimum operating pressure upstream of the pressure raising and shut off valve arrangement at which the pressure raising and shut off valve arrangement opens, and pressure means for opposing closure movement of said closure member reducing said predetermined pressure at which the pressure raising and shut off valve arrangement opens, said pressure means being supplied from the output of said second pump, when said combining spill valve is in a position such that no more than a small proportion of the output of said second pump is spilled to low pressure.

4. A fuel system as claimed in claim 2 wherein said pressure means is a push-piston which can push the closure member of the pressure raising and shut off valve arrangement in an open direction depending upon the pressure applied to the push-piston.

5. A fuel system as claimed in claim 3 wherein said pressure means is a push-piston which can push the closure member of the pressure raising and shut off valve arrangement in an opening direction depending upon the pressure applied to the push-piston.

6. A fuel system as claimed in claim 1 wherein said pressure raising and shut off valve arrangement includes a closure member, fluid pressure means applying a pressure to said closure member whereby said closure member is normally biased towards a position in which the pressure raising and shut off valve arrangement is closed, and so establishing a normal minimum operating pressure upstream of the pressure raising and shut off valve arrangement at which the pressure raising and shut off valve arrangement opens, and, said combining spill valve provides a connection to the pressure raising and shut off valve arrangement which is opened to low pressure to reduce the closing pressure acting on a closure member of the pressure raising and shut off valve arrangement, when the combining spill valve is in a position such that the outputs of the first and second pumps are combined and none of the output of the second pump is spilled to low pressure.

7. A fuel system as claimed in claim 1 wherein said pressure raising and shut off valve arrangement includes a closure member, fluid pressure means applying a pressure to said closure member whereby said closure member is normally biased towards a position in which the pressure raising and shut off valve arrangement is closed, and so establishing a normal minimum operating pressure upstream of the pressure raising and shut off valve arrangement at which the pressure raising and shut off valve arrangement opens, and, said combining spill valve provides a connection to the pressure raising and shut off valve arrangement which is opened to low pressure to reduce the closing pressure acting on a closure member of the pressure raising and shut off valve arrangement, when the combining spill valve is in a position such that the outputs of the first and second pumps are combined and no more than a small proportion of the output of the second plump is spilled to low pressure.

8. A fuel system as claimed in claim 1 wherein said second positive displacement pump is of larger capacity than said first positive displacement pump.

* * * * *